(12) United States Patent
Duncan et al.

(10) Patent No.: US 9,546,915 B2
(45) Date of Patent: Jan. 17, 2017

(54) ENHANCING FUNCTIONALITY OF REFLECTOMETRY BASED SYSTEMS USING PARALLEL MIXING OPERATIONS

(75) Inventors: Roger Glen Duncan, Christiansburg, VA (US); Alexander M. Barry, Roanoke, VA (US); Brooks A. Childers, Christiansburg, VA (US); Robert M. Harman, Troutville, VA (US); Philip Robin Couch, Honiton (GB)

(73) Assignee: BAKER HUGHES INCORPORATED, Houston, TX (US)

( * ) Notice: Subject to any disclaimer, the term of this patent is extended or adjusted under 35 U.S.C. 154(b) by 1024 days.

(21) Appl. No.: 13/271,683

(22) Filed: Oct. 12, 2011

(65) Prior Publication Data
US 2013/0093598 A1 Apr. 18, 2013

(51) Int. Cl.
*G01V 3/00* (2006.01)
*G01K 11/32* (2006.01)
*G01L 1/24* (2006.01)
*G01D 5/353* (2006.01)

(52) U.S. Cl.
CPC .......... *G01K 11/32* (2013.01); *G01D 5/35354* (2013.01); *G01L 1/242* (2013.01)

(58) Field of Classification Search
CPC .................................................. E21B 47/123
USPC ..................................................... 340/854.7
See application file for complete search history.

(56) References Cited

U.S. PATENT DOCUMENTS

| | | | | |
|---|---|---|---|---|
| 4,889,986 A | * | 12/1989 | Kersey | G01D 5/35383 250/227.19 |
| 5,070,483 A | | 12/1991 | Berni | |
| 5,294,075 A | * | 3/1994 | Vertatschitsch | G01S 17/32 244/1 R |
| 5,408,310 A | * | 4/1995 | Furuhashi | G01M 11/3145 356/73.1 |
| 5,995,524 A | * | 11/1999 | Monnard | G02B 6/12019 372/23 |
| 6,008,487 A | * | 12/1999 | Tachikawa | G01M 11/3172 250/227.12 |

(Continued)

FOREIGN PATENT DOCUMENTS

DE 102006015159 A1 10/2007
EP 0605301 6/1994
(Continued)

OTHER PUBLICATIONS

Liehr, Incoherent optical frequency domain reflectometry and distributed strain detection in polymer optical fibers, Meas. Sci. technolo. 21 "2010", pp. 1-4.*
(Continued)

*Primary Examiner* — Amine Benlagsir
(74) *Attorney, Agent, or Firm* — Cantor Colburn LLP

(57) ABSTRACT

A method for estimating a parameter includes: generating an optical signal, the optical signal modulated via a modulation signal; transmitting the modulated optical signal from a light source into an optical fiber, the optical fiber including a plurality of sensing locations disposed along the optical fiber and configured to reflect light; receiving a reflected signal including light reflected from the plurality of sensing locations; and combining, in parallel, each of a plurality of reference signals with the reflected signal to estimate a value of the parameter.

20 Claims, 5 Drawing Sheets

(56) References Cited

U.S. PATENT DOCUMENTS

| | | | |
|---|---|---|---|
| 6,014,239 A * | 1/2000 | Veligdan | H04B 10/114 381/170 |
| 6,285,806 B1 * | 9/2001 | Kersey | G01D 5/35383 385/12 |
| 6,396,574 B1 * | 5/2002 | Lee | G01J 1/4257 356/73.1 |
| 6,892,031 B2 * | 5/2005 | Lee | G01L 1/246 398/78 |
| 7,703,514 B2 | 4/2010 | Chee et al. | |
| 7,876,644 B2 | 1/2011 | Hall et al. | |
| 2004/0027560 A1 | 2/2004 | Fredin et al. | |
| 2004/0178330 A1 * | 9/2004 | Tarvin | G01L 1/246 250/227.23 |
| 2006/0066839 A1 | 3/2006 | Payton | |
| 2007/0051882 A1 | 3/2007 | Childers | |
| 2007/0215795 A1 | 9/2007 | Kameyama et al. | |
| 2009/0103100 A1 * | 4/2009 | Froggatt | G01M 11/3172 356/477 |
| 2009/0303460 A1 | 12/2009 | Habel et al. | |
| 2009/0310627 A1 * | 12/2009 | Chen | H01S 5/146 372/6 |
| 2011/0194166 A1 * | 8/2011 | Varnham | H01S 3/06758 359/279 |

FOREIGN PATENT DOCUMENTS

| | | |
|---|---|---|
| GB | 2190186 A | 11/1987 |
| WO | 03043177 A2 | 5/2003 |

OTHER PUBLICATIONS

Liehr et al: Incoherent optical frequency domain relfectometry and distributed strain detection in polymer optical fibers:, Meas. Sci. Technol. 21 (2010), pp. 15-16.

Ryu et al: "Incoeherent Optical Frequency Domain Reflectiometry for Health Monitoring of Avionics Fiber Optics Networks", AVFOP, Sep. 30-Oct. 2, 2008, pp. 15-16.

Notification of Transmittal of the International Search Report and the Written Opinion of the International Searching Authority, or the Declaration; PCT/US2012/025250; Oct. 30, 2012.

Emir Karamehmedovic, et al. "Fibre-Optic Distributed Temperature Sensing Using IOFDR". Proceedings of SPIE. vol. 5502. pp. 200-203. (Jun. 2004).

H. Ghafoori-Shiraz, et al. "Optical-fiber diagnosis using optical-frequency-domain reflectometry". Optics Letters. vol. 10., No. 3, Mar. 1985. pp. 160-162.

* cited by examiner

ENHANCING FUNCTIONALITY OF REFLECTOMETRY BASED SYSTEMS USING PARALLEL MIXING OPERATIONS

BACKGROUND

Parameter monitoring systems can be incorporated with downhole components as fiber-optic distributed sensing systems (DSS). Examples of DSS techniques include Optical Frequency Domain Reflectometry (OFDR), which includes interrogating an optical fiber sensor with an optical signal to generate reflected signals in the optical fiber sensor.

Many downhole applications typically require measuring parameters at extremely long depths, which are further extended in marine applications. Lead-in lengths (i.e., the length of the optical fiber from an optical interrogator to the region of interest) can thus be quite long, which can reduce the effective measurement range of DSS systems.

SUMMARY

A method for estimating a parameter includes: generating an optical signal, the optical signal modulated via a modulation signal; transmitting the modulated optical signal from a light source into an optical fiber, the optical fiber including a plurality of sensing locations disposed along the optical fiber and configured to reflect light; receiving a reflected signal including light reflected from the plurality of sensing locations; and combining, in parallel, each of a plurality of reference signals with the reflected signal to estimate a value of the parameter.

A system for estimating a parameter includes: a light source in optical communication with an optical fiber, the light source configured to generate an optical signal, the optical fiber configured to receive the optical signal and including a plurality of sensing locations disposed along the optical fiber and configured to reflect light; a modulator configured to modulate the optical signal via a modulation signal; a detector configured to receive a reflected signal including light reflected from the plurality of sensing locations; and a processor configured to combine, in parallel, each of a plurality of reference signals with the reflected signal to estimate a value of the parameter.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION

There are provided systems and methods for interrogating one or more optical fibers. An exemplary method includes generating an optical signal and modulating the optical signal by a modulation signal having a modulation frequency. This modulated optical signal is launched by an interrogator into an optical fiber that includes one or more measurement locations, and a return signal including light reflected and/or backscattered from the measurement locations is received. A plurality of oscillating reference signals are generated (e.g., by a plurality of respective mixers) and mixed or otherwise combined in parallel with the return signal. In one embodiment, each reference signal includes a delay to correspond to a region or length of the optical fiber. In one embodiment, a system includes one or more mixers or other processors configured to receive the return signal from the optical fiber and process the return signal using each reference signal. For example, the system includes a plurality of mixers, each mixer outputting a signal indicative of the difference in frequency between the modulation signal and the reflected signal. This frequency difference may be analyzed to estimate parameters of each optical fiber sensing region.

Figure 1:
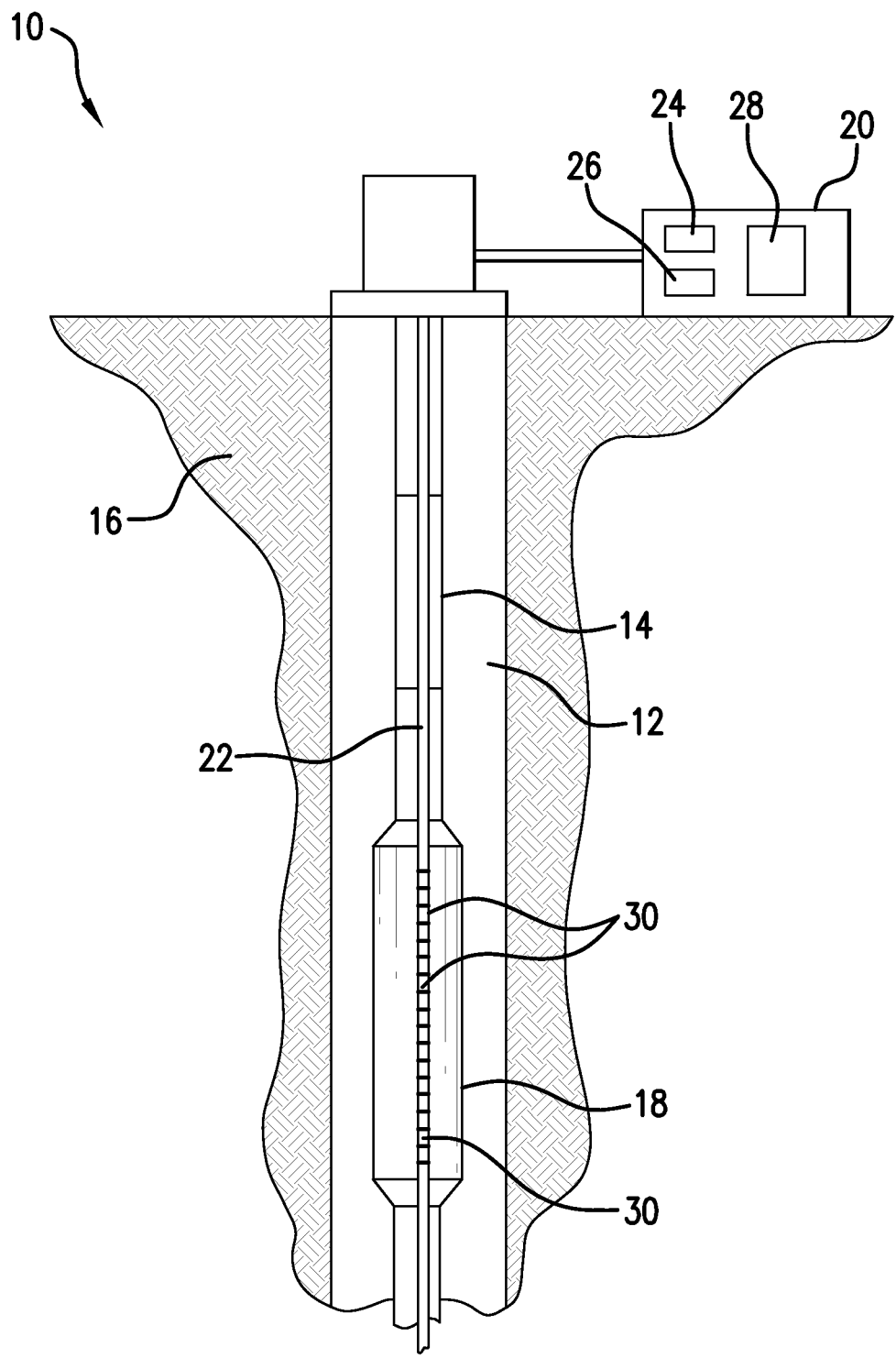
FIG. 1 illustrates an exemplary embodiment of a downhole drilling, monitoring, evaluation, exploration and/or production system.

Referring to FIG. 1, an exemplary embodiment of a downhole drilling, monitoring, evaluation, exploration and/or production system 10 disposed in a wellbore 12 in an earth formation 16 is shown. A borehole string 14 is disposed in the wellbore 12 and performs or facilitates functions such as drilling, production and formation evaluation. The borehole string 14 is made from, for example, a pipe, multiple pipe sections or flexible tubing. The borehole string 14 includes for example, a drilling system and/or a bottomhole assembly (BHA). The system 10 and/or the borehole string 14 include any number of downhole tools 18 for various processes including drilling, hydrocarbon production, and formation evaluation (FE) for measuring one or more physical quantities in or around a borehole. Various measurement tools 18 may be incorporated into the system 10 to affect measurement regimes such as wireline measurement applications or logging-while-drilling (LWD) applications.

In one embodiment, a parameter measurement system is included as part of the system 10 and is configured to measure or estimate various downhole parameters of the formation 16, the borehole 14, the tool 18 and/or other downhole components. The measurement system includes an optical interrogator or measurement unit 20 connected in operable communication with at least one optical fiber 22. The measurement unit 20 may be located, for example, at a surface location, or may be incorporated with the borehole string 12 or tool 18 or otherwise disposed downhole as desired. The measurement unit 20 includes, for example, an electromagnetic signal source 24 such as a tunable light source, a LED and/or a laser, and a signal detector 26. In one embodiment, a processing unit 28 is in operable communication with the signal source 24 and the detector 26 and is configured to control the source 24, receive reflected signal data from the detector 26 and/or process reflected signal data. Although the measurement unit 20 is shown as a single unit, it can also be configured as multiple units. Furthermore, the measurement system described herein is not limited to downhole applications. The measurement system may be used in conjunction with any surface or downhole environment, particularly those that would benefit from distributed parameter (e.g., temperature or pressure) measurements.

The optical fiber 22 is operably connected to the measurement unit 20 and is configured to be disposed downhole. The optical fiber 22 includes one or more sensing locations 30 disposed along a length of the optical fiber. The sensing locations 30 are configured to reflect and/or scatter optical interrogation signals transmitted by the measurement unit 20. Examples of sensing locations include fiber Bragg gratings (FBG), mirrors, Fabry-Perot cavities and locations of intrinsic scattering, as well as any induced reflections. Locations of intrinsic scattering include points in or lengths of the fiber that reflect interrogation signals, such as Rayleigh scattering, Brillouin scattering and Raman scattering locations. The sensing locations 30 are configured to return reflected and/or backscattered signals (referred to herein collectively as "reflected signals" or "return signals") from the sensing locations 30 in response to optical measurement signals (i.e., interrogation signals) launched into the optical fiber 22.

In one embodiment, the measurement system is configured as an optical frequency-domain reflectometry (OFDR) system. In this embodiment, the source 24 includes a continuously tunable laser that is used to spectrally interrogate the optical fiber sensor 22. Scattered signals reflected from intrinsic scattering locations, sensing locations 30 and other reflecting surfaces in the optical fiber 22 are detected as a function of frequency and analyzed. Each scattered signal can be correlated with a location by, for example, a mathematical transform or interferometrically analyzing the scattered signals in comparison with a selected common reflection location. Each scattered signal can be integrated to reconstruct the total length and/or shape of the cable.

One type of OFDR is referred to as incoherent OFDR (IOFDR) (also referred to as Frequency Modulated Continuous-wave (FMCW) techniques). In IOFDR, the interrogation signal is frequency modulated over time (e.g., periodically) via a modulation signal. The frequency may be modulated in a step-wise manner or continuously (swept frequency). The interrogation signal is transmitted into the optical fiber and reflected signals are returned from the sensing locations and detected as a function of modulation frequency. In one embodiment, the reflected signals are mixed with the original modulation signal or another modulation signal in the electrical domain, to generate an interference signal. A Fourier transformation (e.g., a Fast Fourier Transform) of the interference signal as a function of frequency provides the time-domain signal, which can be used to correlate the interference signal with locations along the fiber.

Figure 2:
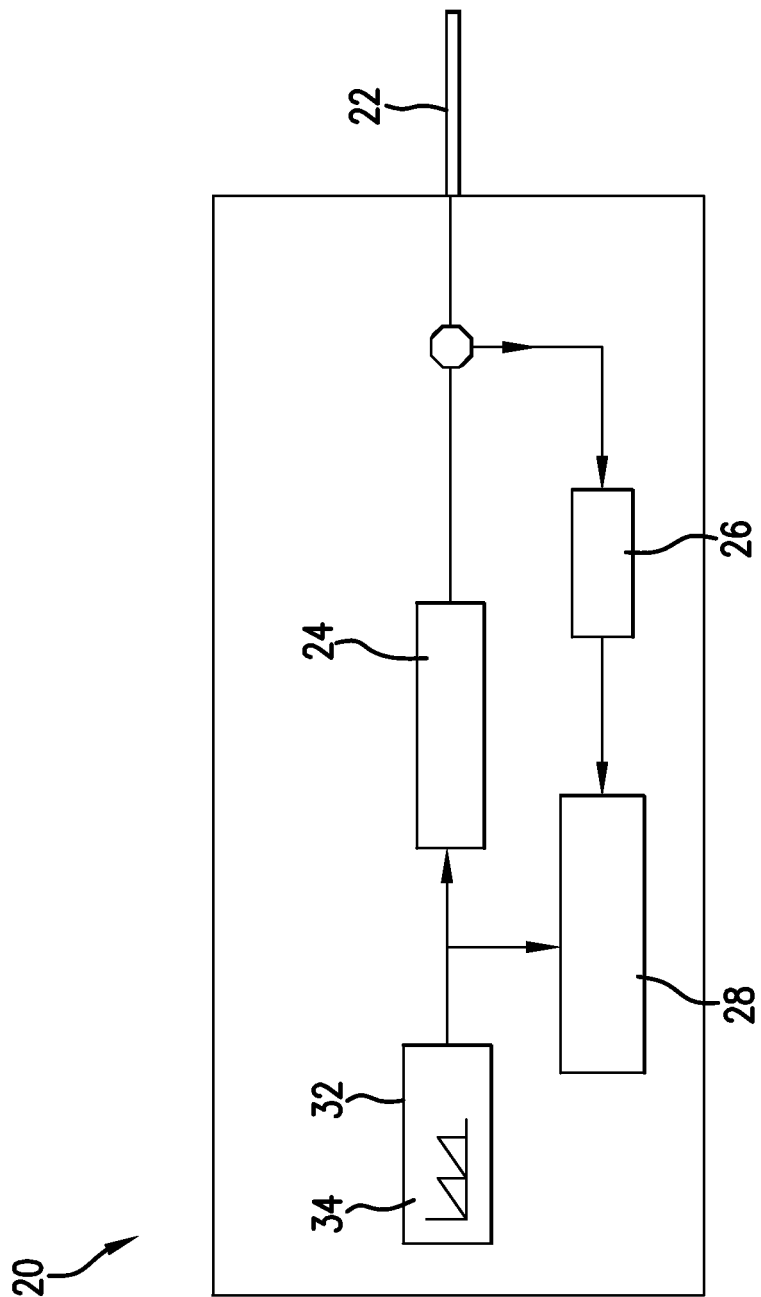
FIG. 2 illustrates an exemplary embodiment of a measurement unit of the system of FIG. 1.

An example of the measurement unit 20 is shown in FIG. 2. In this example, the measurement unit is an incoherent OFDR device. The measurement unit 20 includes the optical source 24, such as a continuous wave (cw) frequency (or wavelength) tunable diode laser optically connected to the optical fiber 22. A modulator (e.g., function generator) 32 in optical communication with the tunable optical source 24 modulates the optical source 24, such as by power, intensity or amplitude, using a modulation signal. The modulation signal is generally an oscillating waveform, such as a sine wave, having a modulation frequency. In one embodiment, the modulator 32 may be incorporated as part of the optical source 24. A detector 26, such as a photodiode, is included to detect reflected signals from the optical fiber 22 in response to modulated optical signal launched from the optical source 24.

Still referring to FIG. 2, a computer processing system 28 is coupled to at least the detector 26, and is configured to process the reflected light signals. For example, the computer processing system 28 can demodulate the reflected signal using a de-modulation signal, such as the modulation signal used in launching the optical interrogation signal, or another local oscillator (referred to as a "reference signal"). The computer processing system 28 can be configured as a signal mixer, which measures the amplitude and phase of the modulation signal or reference signal with respect to the received reflected signal. The processing system 28 may also be configured to further process the demodulated signal. For example, the processing system 28 is configured to transform (e.g., via a FFT) the reflected signal to allow spatial correlation of the signal with the sensing locations 30 or selected locations or regions of the optical fiber 22.

Figure 3:
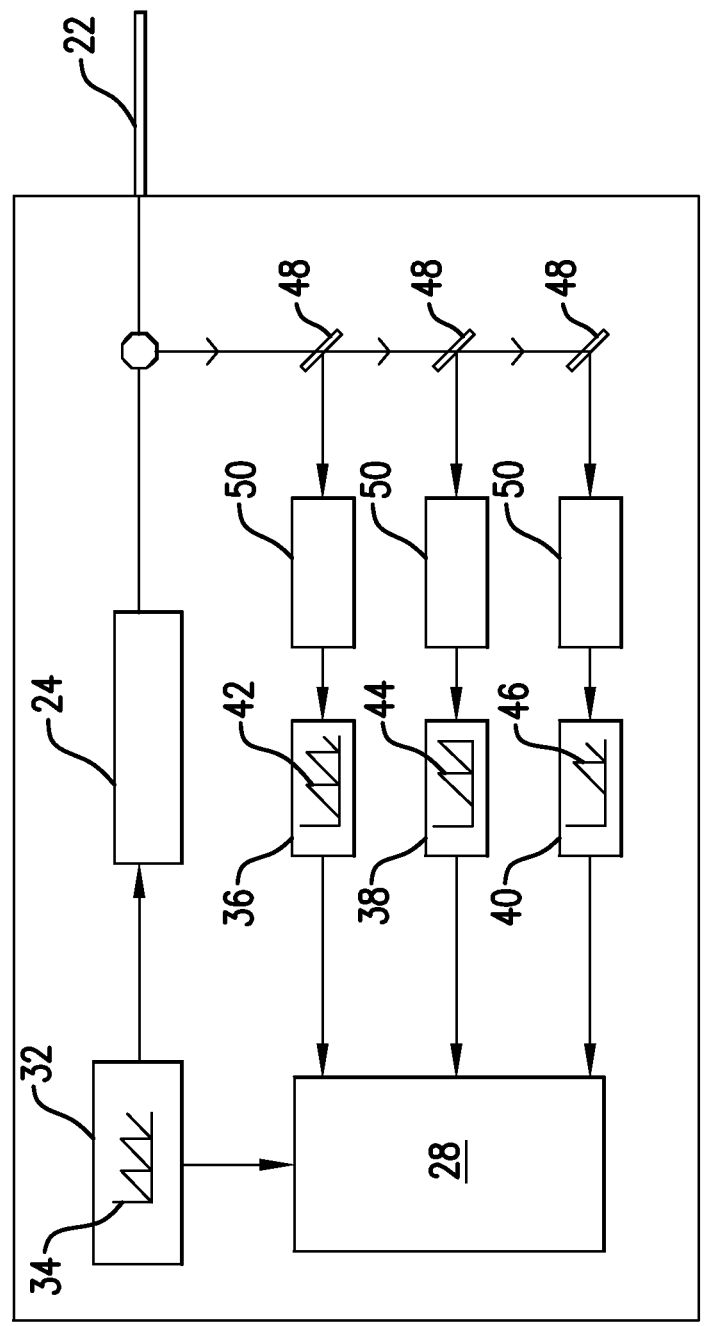
FIG. 3 illustrates another exemplary embodiment of the measurement unit of the system of FIG. 1.

Another embodiment of the measurement unit 20 is shown in FIG. 3. In this embodiment, the measurement unit 20 includes the optical source 24 optically connected to the optical fiber 22, and the modulator 32 in optical communication with the tunable optical source 24. The modulator 32 generates a modulation signal 34 such as an oscillating waveform. The modulator 32, in addition to generating the modulation signal for use by the optical source, sends the modulation signal to the computer processing system 28.

In this embodiment, the measurement unit 20 includes a plurality of signal processors 36, 38 and 40 that are each configured to generate a respective reference signal 42, 44 and 46, each of which can be applied to the reflected light signal, i.e., via mixing or demodulation. The reference signals 42, 44 and 46 are configured to be applied to the reflected signal in parallel, that is, each reference signal is applied to the same reflected signal. For example, each reference signal 42, 44 and 46 is applied to the same return signal over a substantially identical time window, and/or each reference signal is at least substantially simultaneously applied to the return signal.

In one embodiment, each of the modulation signal 34 and the reference signals 42, 44 and 46 are oscillating signals having a time-varying oscillation frequency, also referred to as the "modulation frequency". Each signal includes a respective oscillation frequency or modulation frequency that varies over time according to some function, such as a step function or a linear function.

FIG. 3 illustrates an exemplary configuration for applying the reference signals. The measurement unit 20 includes a beam splitter 48 for splitting the return signal into multiple constituent return signals. Each constituent return signal beam may have the same or different power, but has the same wavelength and modulation. A detector (e.g., an optoelectrical converter) 50 converts each respective constituent return signal to an electrical signal. Each detector signal is mixed or otherwise combined with a respective reference signal 42, 44, 46 via the signal processors 36, 38 and 40, which may be configured as, for example, radiofrequency (RF) mixers.

The configuration shown in FIG. 3 is not intended to be limiting, as any suitable configuration can be used for introducing multiple local oscillator signals and performing multiple combination or mixing operations in parallel on the same reflected or backscattered signal. Such configurations include employing multiple signal generation circuits, or utilizing other digital delay methodologies. For example, the reflected signal can be converted by a single detector into an electric signal, and the converted signal can be input into multiple signal generation circuits, each providing a different reference signal to combine with the reflected signal. Other embodiments may include introducing the reference signals optically to each constituent reflected signal, such as by optically delaying each constituent reflected signal and mixing each delayed reflected signal with the modulation signal.

The computer processing system 28 is coupled to at least the detector 26, and is configured to process the reflected light signals. For example, the computer processing system 28 can demodulate or mix the return signal with a reference signal such as the delayed reference signals 42, 44 and 46. The computer processing system can be configured as a signal mixer, which measures the amplitude and phase of each modulation signal with respect to the received reflected signal. Various additional components may also be included as part of the measurement units 20 and 30, such as a spectrum analyzer, beam splitter, light circulator, gain meter, phase meter, lens, filter and fiber optic coupler for example.

Figure 4:
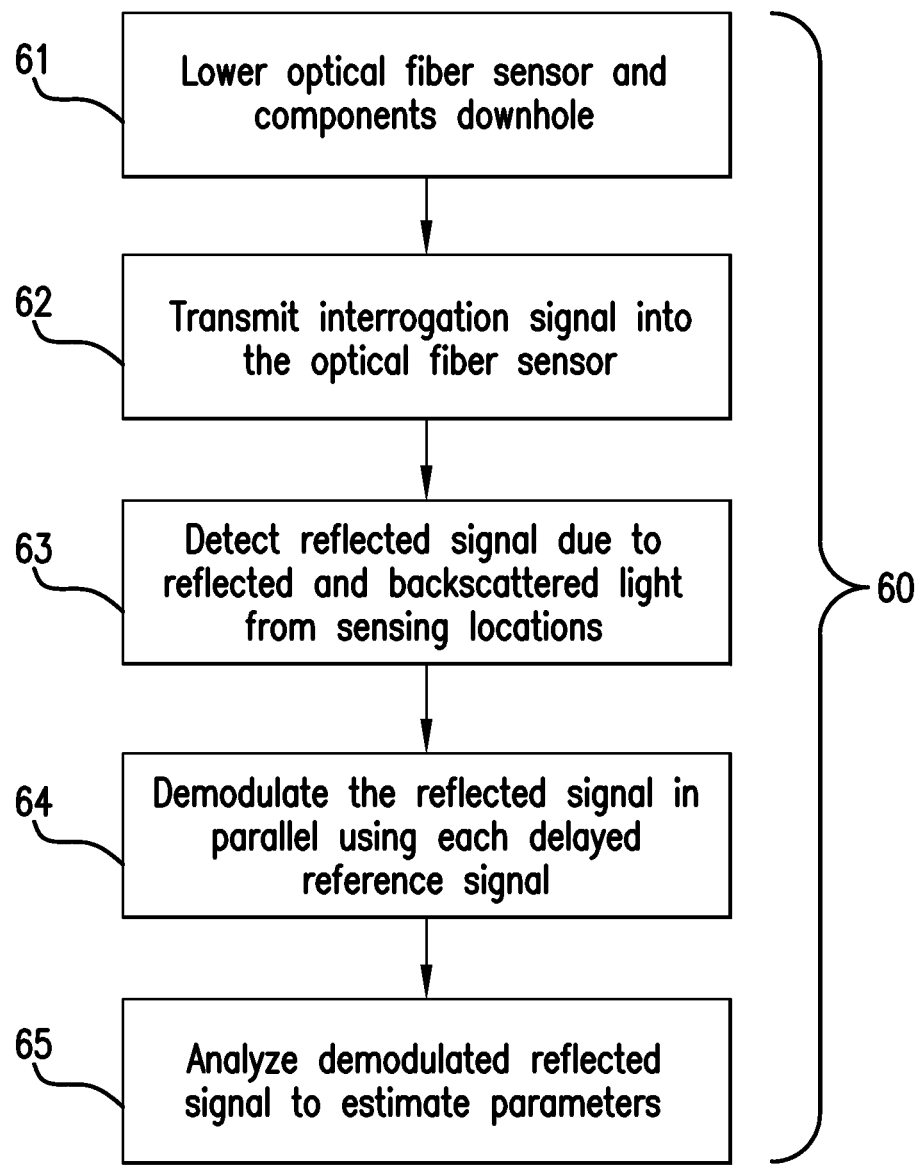
FIG. 4 is a flow chart illustrating an exemplary embodiment of a method of estimating a parameter.

FIG. 4 illustrates a method 60 of measuring downhole parameters. The method 60 includes one or more stages 61-65. Although the method 60 is described in conjunction with the system 10 and the measurement systems described above, the method 60 is not limited to use with these embodiments, and may be performed by the measurement unit 20 or other processing and/or signal detection device. In one embodiment, the method 60 includes the execution of all of stages 61-65 in the order described. However, certain stages may be omitted, stages may be added, or the order of the stages changed.

In the first stage 61, the optical fiber 22 along with the borehole string 12, tools 18 and/or other components are lowered downhole. The components may be lowered via, for example, a wireline or a drillstring.

In the second stage 62, a modulated optical signal having a wavelength "λ" is generated and launched into the optical fiber 22. The modulator 32 modulates the power, intensity and/or amplitude of the optical signal (e.g., using a modulation signal such as modulation signal 34) according to a sinusoidal or other oscillating function having a time-varying oscillation frequency or modulation frequency. In general, the modulation frequencies are in the radio frequency range, although other frequencies can be used down to zero Hertz.

Figure 5:
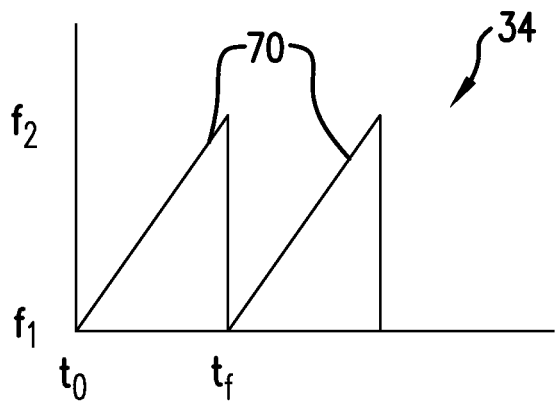
FIG. 5 is an illustration of a modulation frequency of a modulated optical signal.

For example, as shown in FIG. 5, the oscillation frequency varies over time according to a selected function. For example, the optical signal modulation frequency is swept, i.e., changed, by the modulator 32 over a period of time, such as in a continuous or nearly continuous change (e.g., linear change, exponential). For example, the modulator 32 modulates the optical signal with a modulation signal 34 having a modulation frequency represented by a linear function 70. This function may be produced by, e.g., a function generator, which regulates the current applied to the laser. In this example, the function begins at an initial time "$t_0$", at which the modulation frequency is at a selected minimum "$f_1$" (e.g., at or near zero), and ends at a time "$t_f$", at which the modulation frequency is a selected maximum "$f_2$". The function may repeat as desired. Multiple modulated signals may be iteratively launched for multiple laser wavelengths.

In the third stage 63, a reflected signal is detected by the detector 26, 50 and corresponding return or reflected signal data is generated by the processor 28. The reflected signals may include light reflected and/or backscattered from sensing locations 30. For example, the reflected signal is a result of reflections and/or backscattering from FBGs, Rayleigh scattering, Raman scattering, and/or Brillouin scattering.

Figure 6:
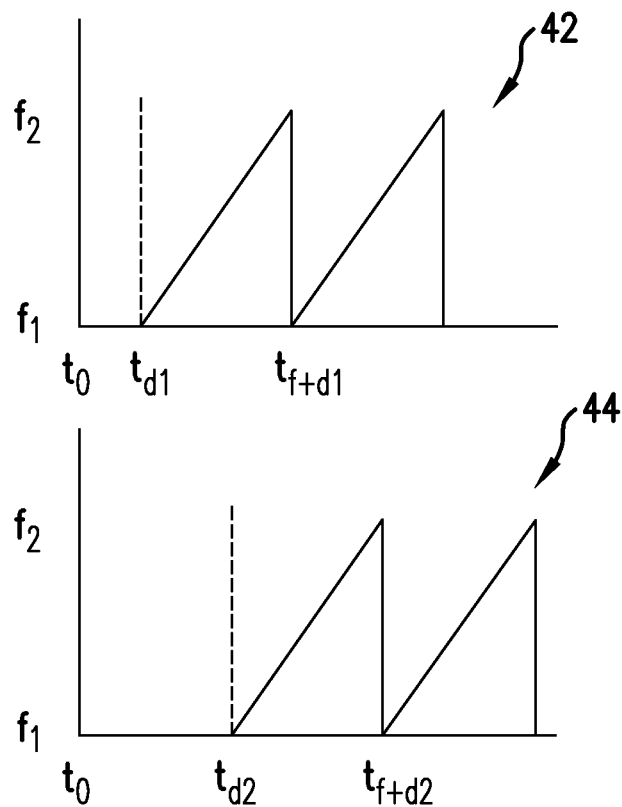
FIG. 6 is an illustration of a modulation frequency of a plurality of demodulation signals.

In the fourth stage 64, the reflected signal is mixed or demodulated with respect to multiple reference signals. The reflected signal is mixed with reference signals such as reference signals 42 and 44, each of which has an oscillation frequency that varies differently, e.g., that varies according to a different function. In one embodiment, each reference signal modulation frequency varies according to a function having at least substantially the same form as the modulation signal, the function being temporally delayed relative to the modulation signal according to a selected time delay. For example, as shown in FIG. 6, each reference signal has at least substantially the same form as the modulation signal 34, i.e., is a sinusoidal waveform having a modulation frequency that is varied over time. In this example, both the modulation signal 34 and the reference signals 42 and 44 have at least substantially the same sweep rate (i.e., rate of change of the modulation frequency from $t_0$ to "$t_{f+d}$" over some time period), but the reference signals 42 and 44 are time delayed. The time delays "d1" and "d2" in this example are represented by the time period from $t_0$ to "$t_{d1}$" and from $t_0$ to "$t_{d2}$", respectively. The reference signal can be delayed by any suitable method or mechanism, such as by generating the delayed reference signal by the modulator 34 or a separate signal generation circuit. Other methods of introducing the delay include using digital delay devices such as first-in first-out (FIFO) buffers. As discussed above, the return optical signal can alternatively be split into multiple constituent signals having the same phase, and optically delayed (e.g., by d1 and d2, respectively). The optically delayed signals can then each be mixed with the original modulation signal 34.

The amount of each delay corresponds to, for example, the time-of-flight of an optical signal between a launching location (e.g., input location of the optical source 24) and a selected location or region in the optical fiber 22. The time of flight may be acquired or calculated by any suitable means, such as by using the measurement unit 20 or other optical source to send a pulsed signal and record the time of receipt of resulting reflected signals. Each delay may be at least substantially equal to the difference in the time of flight between two locations bounding a selected region of the fiber.

In one embodiment, the return optical signal is split into multiple constituent signals, and each constituent signal is converted into an electrical signal (e.g., via detector 50 including an O/E converter). Each electrical signal is individually mixed with a respective reference signal 42, 44 and 46 to generate a data set for a region of the optical fiber corresponding to the delay. In another embodiment, the return optical signal is converted into an electrical signal without splitting the optical signal, and the electrical signal is mixed in parallel with each reference signal.

The mixing operations are each performed on the return signal over the same time window, so as to generate data corresponding to different lengths of the optical fiber. In one embodiment, the mixing operations performed on the return signal are each performed simultaneously. These operations in effect produce multiple data sets, each corresponding to some portion of the length of the optical fiber and/or some location or location range of different sensors along the optical fiber. Because longer fiber lengths produce signals with greater amounts of chirp noise, these reduced length data sets reduce the chirp noise, allowing for increased sweep rates for modulation signals relative to techniques that utilize a single reference signal.

The demodulated reflected signals may then be inversely transformed using a mathematical algorithm such as a Fast Fourier Transform (FFT) into a spatial frequency domain.

Stages 61-64 may be repeated for optical signals having multiple optical wavelengths. For example, stages 61-64 are performed using a modulated signal having a first substantially constant first wavelength $\lambda_1$, and repeated for N subsequent signals having wavelengths $\lambda_2$-$\lambda_N$. Multiple sets of readings may be assembled into one composite set of readings, which provides a complex data set containing, among other parameters, amplitude of reflection (or transmission) and spatial location data for each of the components in optical communication with the optical fiber 22. The modulated signal wavelength can be varied at any desired rate, e.g., swept in a step-wise manner or a continuous manner.

In the fifth stage 65, the mixed signal data is utilized to estimate various parameters along the optical fiber 22. The reflected signal data is correlated to locations on or lengths of the optical fiber 22, and parameters are estimated for one or more sensing locations 30. Examples of such parameters include temperature, pressure, vibration, force, strain and deformation of downhole components, chemical composition of downhole fluids or the formation, acoustic events, and others.

The systems and methods described herein provide various advantages over prior art techniques. The systems and methods provide a mechanism for compensating for or reducing/nullifying effects such as reduced signal-to-noise ratios (SNRs) due to increases in sensing lengths. For example, the systems and methods increase the measurement utility of OFDR systems by introducing parallel mixing operations on the same reflected and/or backscattered optical signal, which enables an increase in the effective number of sensors that can be monitored with an acceptable SNR and/or an increase in the SNR of each of the measurements, improving measurement fidelity. This can permit an effectively higher sweep rate for a given signal generation circuit, while enabling the analysis of several segments of the DUT in parallel.

In support of the teachings herein, various analysis components may be used, including a digital and/or an analog system. Components of the system, such as the measurement unit 20 or 30, the processor 28 and other components of the system 10, may have components such as a processor, storage media, memory, input, output, communications link, user interfaces, software programs, signal processors (digital or analog) and other such components (such as resistors, capacitors, inductors and others) to provide for operation and analyses of the apparatus and methods disclosed herein in any of several manners well appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

It will be recognized that the various components or technologies may provide certain necessary or beneficial functionality or features. Accordingly, these functions and features as may be needed in support of the appended claims and variations thereof are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for estimating a parameter, the method comprising:
   generating an optical signal, the optical signal modulated via a modulation signal;
   transmitting the modulated optical signal from a light source into an optical fiber, the optical fiber including a plurality of sensing locations disposed along the optical fiber and configured to reflect a light, the plurality of sensing locations including a first sensing location and a second sensing location disposed at different regions of the optical fiber;
   receiving a reflected signal including the light reflected from the plurality of sensing locations over a selected time window;
   splitting the reflected signal into a plurality of constituent reflected signals including at least a first reflected signal and a second reflected signal, the first reflected signal and the second reflected signal having the same wavelength and modulation, the first reflected signal and the second reflected signal associated with the same selected time window and including a portion of the light reflected from the plurality of sensing locations;
   transmitting the first reflected signal to a first signal processor, and separately transmitting the second reflected signal to a second signal processor;
   combining the first reflected signal with a first reference signal by the first signal processor to generate a first combined signal associated with the first sensing location;
   combining the second reflected signal with a second reference signal by the second signal processor to generate a second combined signal associated with the second sensing location, the second reflected signal different than the first reflected signal, wherein the first signal processor and the second signal processor perform the combining of the first reflected signal with a first reference signal and the combining of the second reflected signal with a second reference signal in parallel and at least substantially simultaneously; and
   estimating a value of the parameter based on the combining of the first reflected signal with a first reference signal and the combining of the second reflected signal with a second reference signal, wherein said estimating includes determining a length and/or shape of a first region of the optical fiber associated with the first sensing location based on the first combined signal, and determining the length and/or shape of a second region of the optical fiber associated with the second sensing location based on the second combined signal.

2. The method of claim 1, wherein the modulation signal and the first and second reference signals are oscillating signals having a time-varying oscillation frequency, each of the first and second reference signals including a respective oscillation frequency that varies over time according to a different function.

3. The method of claim 2, wherein the first reflected signal and the second reflected signal are at least substantially simultaneously transmitted over different paths.

4. The method of claim 2, wherein each of the first and second reference signals includes the respective oscillation frequency that varies over the time according to a reference signal function having at least substantially the same form as the modulation signal, the reference signal function being temporally delayed relative to the modulation signal according to a selected time delay.

5. The method of claim 4, wherein the reference signal function is delayed according to a different time delay.

6. The method of claim 5, wherein the reference signal function includes a time delay selected to correspond with a distance between the light source and one of the plurality of sensing locations.

7. The method of claim 1, wherein the first reference signal is temporally delayed according to a first time delay, and the second reference signal is temporally delayed according to a second time delay that is different than the first time delay.

8. The method of claim 7, wherein the modulation signal varies according to a function that begins at an initial time, the first reference signal has a first oscillation frequency that is varied between a first delayed initial time and a final time, the second reference signal has a second oscillation frequency that is varied between a second delayed initial time and the final time, each of the first delayed initial time and the second delayed initial time occurring at a different selected time after the initial time.

9. The method of claim 8, wherein the first reflected signal is demodulated with the first reference signal over a first time period defined by the first delayed initial time and the final time, and the second reflected signal is demodulated with the second reference signal over a second time period defined by the second delayed initial time and the final time.

10. The method of claim 1, further comprising generating a plurality of combined signals corresponding to selected lengths of the optical fiber, and transforming each combined signal from the plurality of combined signals from a frequency domain into a time domain to provide a measurement set corresponding to each selected length of the optical fiber.

11. A system for estimating a parameter, the system comprising:
a light source in optical communication with an optical fiber, the light source configured to generate an optical signal, the optical fiber configured to receive the optical signal and including a plurality of sensing locations disposed along the optical fiber and configured to reflect a light, the plurality of sensing locations including a first sensing location and a second sensing location disposed at different regions of the optical fiber;
a modulator configured to modulate the optical signal via a modulation signal;
a beam splitter configured to split a reflected signal including the light reflected from the plurality of sensing locations into a plurality of constituent reflected signals, wherein the plurality of constituent reflected signals including a first reflected signal and a second reflected signal, the first reflected signal and the second reflected signal having substantially the same wavelength and modulation, the first reflected signal and the second reflected signal associated with the same selected time window and including a portion of the light reflected from the plurality of sensing locations;
a first signal processor configured to receive the first reflected signal and operate to combine the first reflected signal with a first reference signal to generate a first combined signal associated with the first sensing location;
a second signal processor configured to receive the second reflected signal and operate to combine the second reflected signal with a second reference signal to generate a second combined signal associated with the second sensing location, the second reflected signal different than the first reflected signal, the first signal processor and the second signal processor configured to operate the combining of the first reflected signal with a first reference signal and the combining of the second reflected signal with a second reference signal in parallel and at least substantially simultaneously; and
a processor configured to estimate a value of the parameter based on combined signals generated by the first signal processor and the second signal processor, the processor configured to estimate the value based on determining a length and/or shape of a first region of the optical fiber associated with the first sensing location based on the first combined signal, and determining a length and/or shape of a second region of the optical fiber associated with the second sensing location based on the second combined signal.

12. The system of claim 11, wherein the modulation signal and the first and second reference signals are oscillating signals having a time-varying oscillation frequency, and each of the first and second reference signals includes a respective oscillation frequency that varies over time according to a different function.

13. The system of claim 12, wherein the first reflected signal and the second reflected signal are at least substantially simultaneously transmitted over different paths.

14. The system of claim 13, wherein each of the first and second reference signals includes the respective oscillation frequency that varies over the time according to a reference signal function having at least substantially the same form as the modulation signal, the reference signal function being temporally delayed relative to the modulation signal according to a selected time delay.

15. The system of claim 14, wherein the reference signal function is delayed according to a different time delay.

16. The system of claim 14, wherein the reference signal function includes a time delay selected to correspond with a distance between the light source and one of the plurality of sensing locations.

17. The system of claim 12, wherein the modulation signal has an oscillation frequency that is varied between an initial time and a final time.

18. The system of claim 17, wherein the first reference signal has a first oscillation frequency that is varied between a first delayed initial time and the final time, the second reference signal has a second oscillation frequency that is varied between a second delayed initial time and the final time, each of the first delayed initial time and the second delayed initial time occurring at a different selected time after the initial time.

19. The system of claim 18, wherein the first reflected signal is demodulated with the first reference signal over a first time period defined by the first delayed initial time and the final time, and the second reflected signal is demodulated with the second reference signal over a second time period defined by the second delayed initial time and the final time.

20. The system of claim 11, wherein the system is configured to generate a plurality of combined signals corresponding to selected lengths of the optical fiber, and transform each combined signal from the plurality of combined signals from a frequency domain into a time domain to provide a measurement set corresponding to each selected length of the optical fiber.

* * * * *